United States Patent Office 3,187,064
Patented June 1, 1965

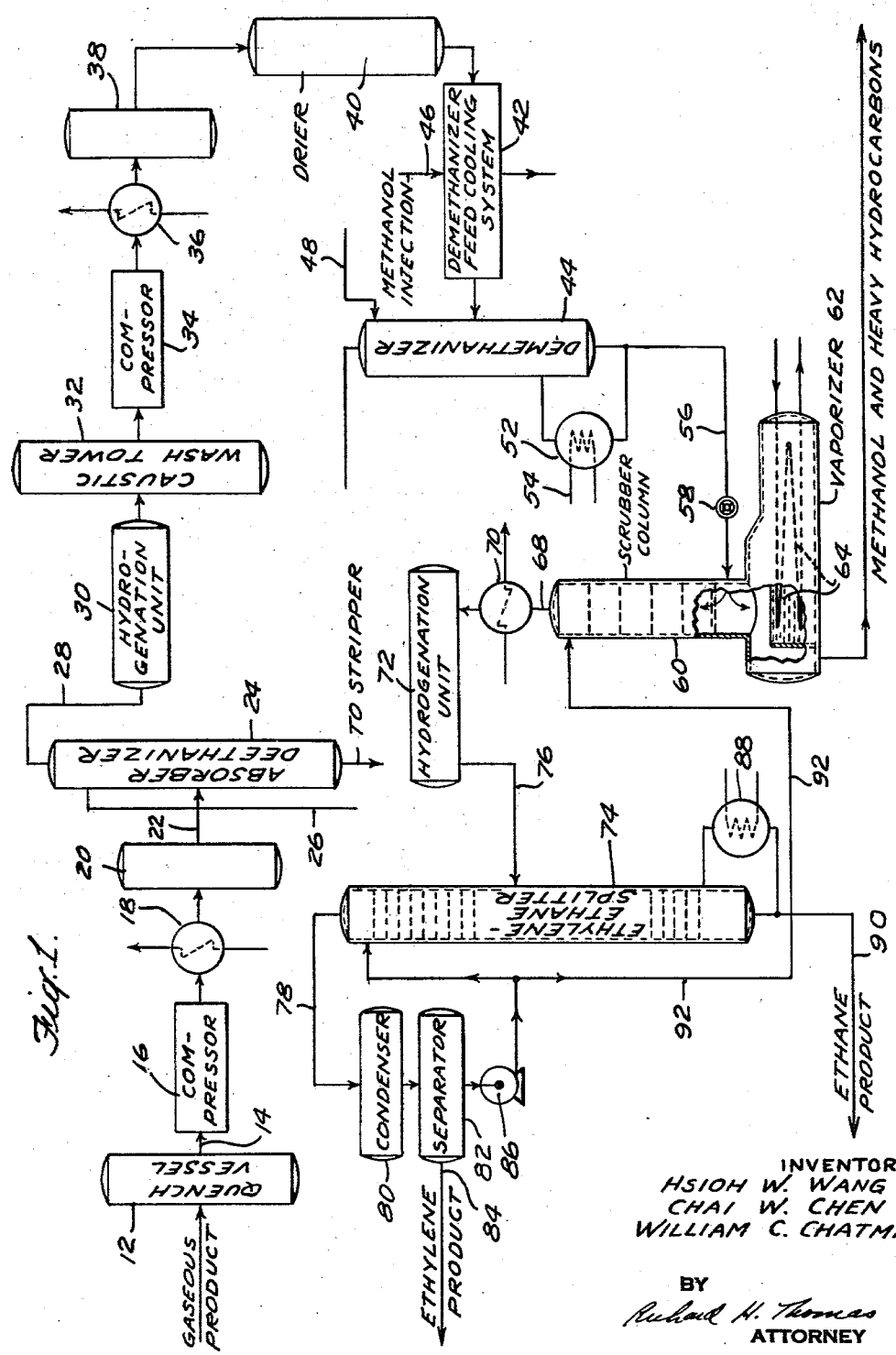

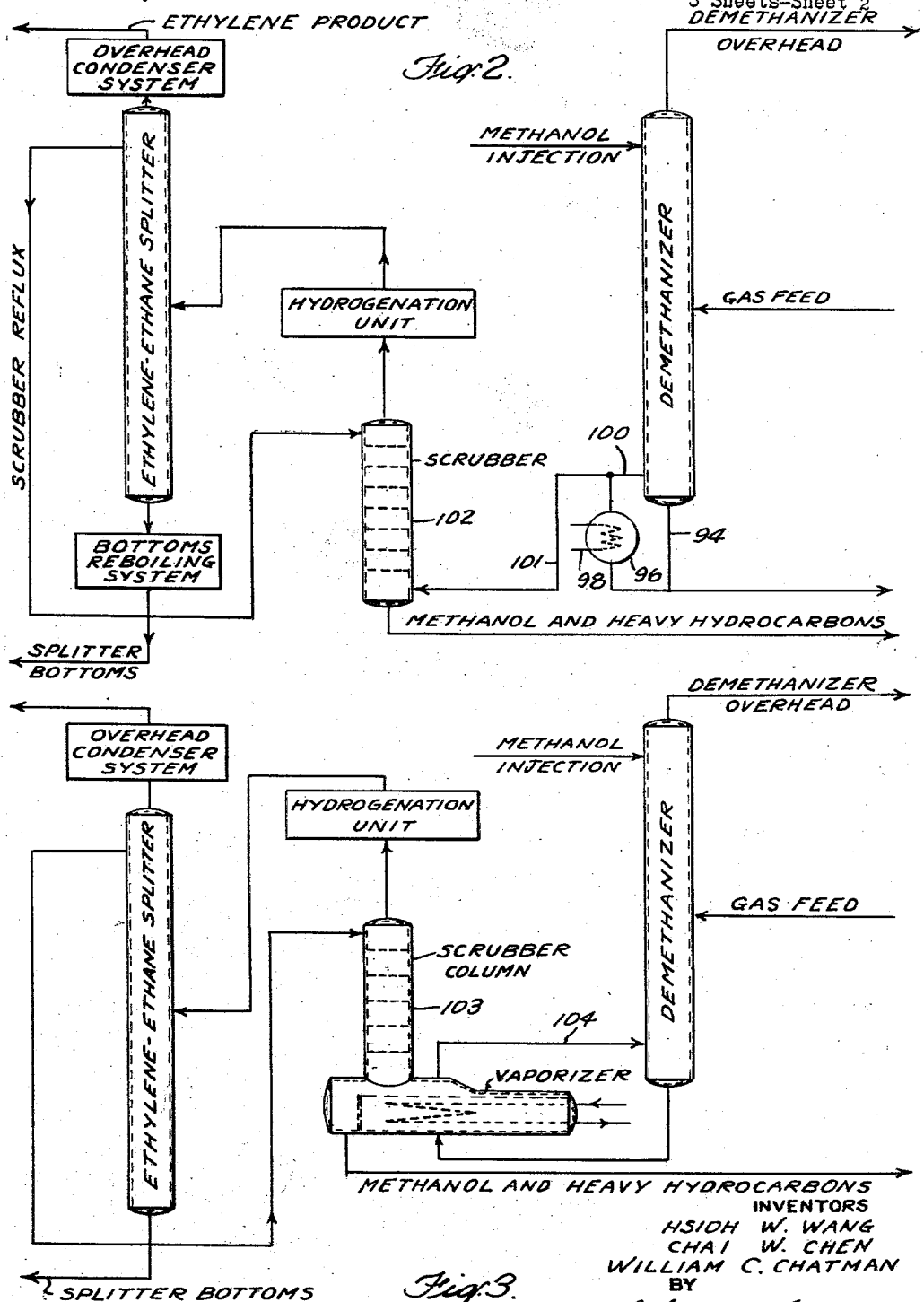

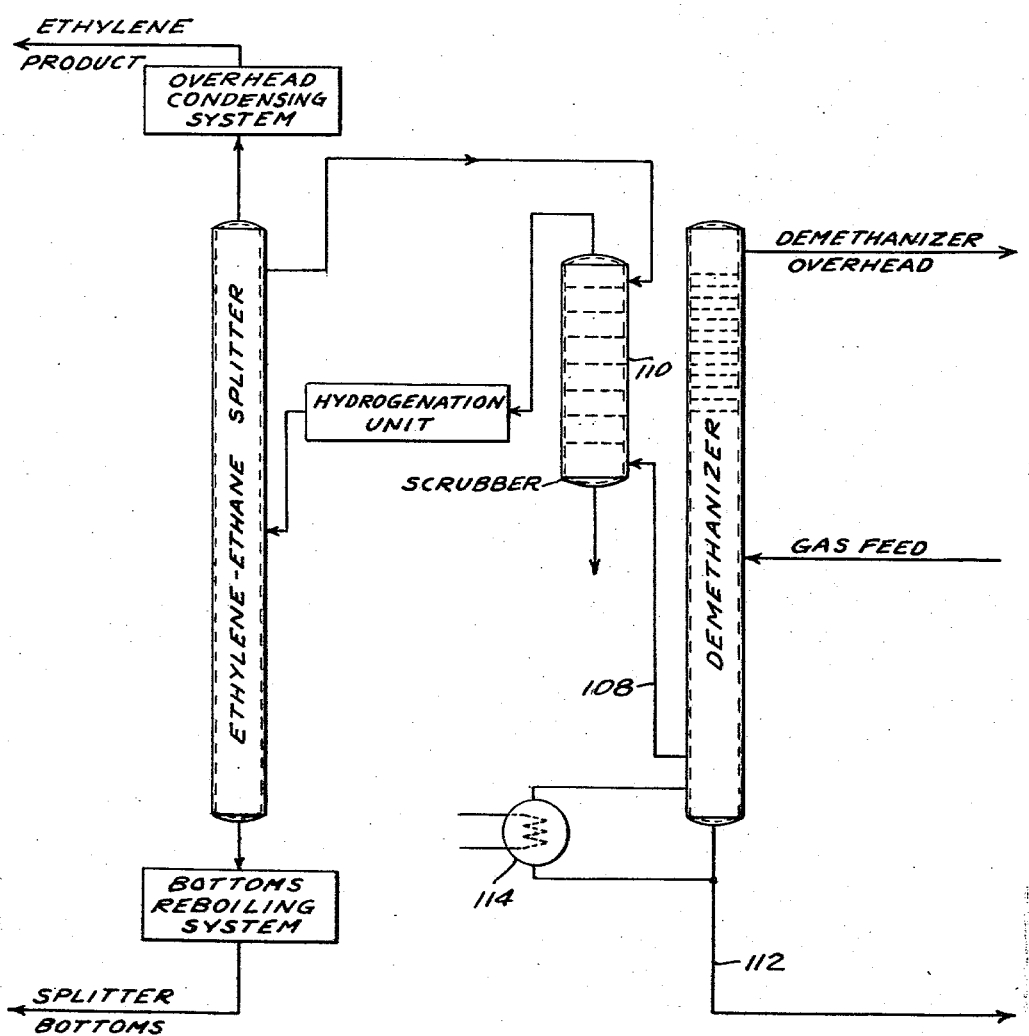

3,187,064
ETHYLENE RECOVERY SYSTEM
Hsioh W. Wang and Chai Wei Chen, Freeport, N.Y., and William C. Chatman, Matawan, N.J., assignors to Foster Wheeler Corporation, New York, N.Y., a corporation of New York
Filed May 9, 1962, Ser. No. 193,413
10 Claims. (Cl. 260—677)

This invention relates to a method and apparatus for treating a mixture of light gases, including ethane and lighter hydrocarbons together with hydrogen, and small quantities of $C_3$ and heavier hydrocarbons, for the recovery of ethylene.

More particularly, the invention relates to improvements in a process for the recovery and purification of ethylene from a mixture of normally gaseous components, which process includes the steps of cooling and compressing the mixture and subjecting it to low temperature fractionation under high pressure for the removal of methane and hydrogen, and the step of hydrogenating acetylene in the mixture to convert it to ethylene.

The invention is of particular use in obtaining from a hydrocarbon feed mixture containing ethane and heavier and lighter hydrocarbons, and in addition absorber lean and/or sponge oil and small amounts of methanol added prior to or during refrigeration, an ethylene product gas which is substantially pure (approximately 99.9% plus) and free of trace amounts of acetylene. Typical suitable gases which contain ethylene are refinery gases, and gases produced by pyrolysis of saturated hydrocarbons.

In the recovery of ethylene from a mixture of light gases, including methane, hydrogen, acetylene, and ethane, a process of the type to which the invention relates may include steps involving completely deethanizing the mixture in an absorber-deethanizer, and passing the absorber overhead gases containing ethane and lighter hydrocarbons and hydrogen, together with a small quantity of $C_3$ hydrocarbons and absorber lean and/or sponge oil, to hydrogenation and caustic treating facilities in order to remove sulphur compounds and a major portion of the acetylene present.

Subsequently, the mixture may be compressed, dried, subjected to refrigeration, and passed to a demethanizer to remove methane and hydrogen from the mixture. After that, the demethanizer bottoms are vaporized and fractionated in an ethylene-ethane splitter to recover an ethylene fraction as an overhead or sidestream product from the splitter.

Recent manufacturing specifications for the recovery of ethylene require that all but about five p.p.m. of acetylene be removed from the ethylene. In order to obtain such a high degree of purity, it is necessary to use a two-stage hydrogenation process, with the second stage following demethanization, and although a nickel catalyst may be used in the first stage, a cobalt molybdate catalyst is required for the second stage.

In this sequence of operations, two problems have been encountered. The first is that prior to demethanization, which is at a low temperature, methanol is periodically or continually injected into the gaseous feed stream in order to prevent freezing.

It has been found that the methanol in the system acts as a poison to this second stage hydrogenation catalyst. In particular, it was discovered that a feed gas into the hydrogenation second stage, containing about 1,000 p.p.m. methanol ($CH_3OH$), caused increased acetylene leakage after 26 hours running time.

A second problem occurring in the above sequence of operations is that lean and/or sponge oil is carried with the gaseous phase and ultimately leaves the system with the ethylene-ethane splitter bottoms material. This oil substantially raises the bottoms temperature in the splitter, but in order to achieve good heat recovery, the bottoms temperature ideally should be maintained as low as possible.

These disadvantages are overcome in accordance with the present invention, by subjecting the vaporized demethanizer bottoms to counter-current contact in a minimum tray scrubber with a scrubbing liquid capable of removing methanol and heavier hydrocarbons, for instance, the lean or sponge oil from the stream. The scrubbing liquid used is a $C_2$-rich liquid withdrawn from the ethane-ethylene splitter, and may be withdrawn from any tray of the splitter. In counter-current contact with the gaseous stream, the scrubbing liquid condenses the methanol and heavier hydrocarbons.

In an embodiment of the invention, the reboiler of the demethanization is associated with the scrubber column in a novel manner which avoids the use of a second heat exchanger for vaporizing the demethanizer bottoms in the scrubber.

In a third embodiment, a main portion of the demethanizer bottoms material is withdrawn from a lower part of the demethanizer tower as a side stream vapor. The vapor side stream contains essentially all of the ethylene and ethane present in the demethanizer, whereas a small bottoms liquid stream also withdrawn from the demethanizer contains the bulk of the methanol and heavier hydrocarbons. The vapor side stream is passed through the scrubber column to remove the remaining portion of the methanol and heavier hydrocarbons withdrawn with it, but as in the second embodiment described above, the arrangement avoids the use of a second heat exchanger.

The invention and the advantages thereof will become more apparent upon consideration of the following specification and detailed description with reference to the accompanying drawings, in which:

FIGURE 1 represents a schematic flow diagram of an ethylene recovery process embodying the invention;

FIGURES 2 and 3 are schematic flow diagrams of different arrangements of an embodiment of the invention; and FIGURE 4 is a schematic flow diagram of a third embodiment of the invention.

Referring to FIGURE 1, a gaseous product containing ethylene, and lower and higher boiling gaseous compounds including methane and hydrogen, acetylene, ethane, and other hydrocarbons having a higher boiling point than ethylene, obtained from a pyrolysis furnace or a thermal cracking unit, is quenched in an oil quench vessel 12 and passed by a line 14 through a compressor 16, heat exchanger 18 and a separator drum 20 where it is compressed to a superatmospheric pressure and cooled to a desired temperature. The cooled gaseous stream is then fed under pressure in line 22 to an absorber-deethanizer 24 where it is subjected to counter-current contact with a lean and/or sponge oil admitted through line 26 under reflux conditions such that a $C_2$ and lower boiling gaseous fraction is separated from a higher boiling fraction, the latter containing $C_3$ and heavier hydrocarbons such as propane, propylene and butane.

The gaseous fraction withdrawn in line 28 and consisting largely of ethane and lighter hydrocarbons and hydrogen, together with a small quantity of $C_3$ and heavier hydrocarbons and absorber lean and/or sponge oil, is passed to hydrogenation facilities 30 and a caustic wash tower 32 in order to remove a major portion of the acetylene present and sulphur compounds, organic acids and carbon dioxide. The gas purification or caustic wash treatment in this stage is well known. In the hydrogenation facility, acetylene is hydrogenated to ethylene and other higher molecular weight compounds than ethylene. The hydrogenation may be effected in the presence of a suitable catalyst such as nickel oxide.

After washing, the gases are again compressed at 34, this time to a pressure in the range of 500–600 p.s.i.g., and are initially cooled in heat exchanger 36 to a temperature of about 60° F. After passing through a separator drum 38, the moisture content is reduced to a minimum level in a drier 40, and the gases are subjected to cooling in a multi-stage heat exchanger 42, wherein they are cooled to a temperature of about −80° F. The compressed and cooled stream is then fed to a demethanizer 44 where it is fractionated under pressure to remove the methane and lower boiling constituents, such as hydrogen, as a gaseous fraction.

In the demethanizing stage, the overhead product is first passed to a reflux condenser not shown where it is partially liquified and discharged into a separator also not shown. In the condenser, a refrigerated medium is used to impart a low temperature to the overhead fraction sufficient to maintain the unliquified portion of the overhead as substantially a hydrogen and methane fraction, having only a small amount of ethylene and heavier constituents. The liquid portion of the demethanizer overhead product is separated from the uncondensed or unliquified portion in the separator, and is discharged into the top of the demethanizer tower as reflux.

During cooling the demethanized feed gas, methanol is intermittently injected into the gas feed in line 46 to prevent freezing of the line and downstream equipment. In this respect, the dried gas, being substantially free of water, still has a moisture content sufficient to cause difficulty. Generally, the methanol is injected when a pressure increase in the line, indicating plugging of the line, is detected.

The top of the demethanizer tower is operated at a low temperature, so methanol is also injected into the tower in line 48 to prevent freezing.

The liquid bottoms portion is passed by a line 56 leading from the bottom of the demethanizer tower through a pressure reducing valve 58 where it may be partially vaporized, to a scrubber column 60 where the ethylene-ethane gaseous fraction flows upwardly through trays or packing in the column. The column is provided with a vaporizer 62 having a heating coil 64 adapted to vaporize any $C_2$ and lower weight compounds in liquid form, the heavier than ethane hydrocarbons condensing at the bottom of the vaporizer. The scrubber column in this instance is a minimum tray column operated at a temperature of about 30° F. under a pressure of about 335 p.s.i.g.

The vaporized scrubbed gases pass from the top of the column by a line 68 to a heat exchange unit 70 where the gas temperature is further increased to about 390° F. and to a second stage hydrogenation facility 72. In the scrubber column, the vaporized mixture is passed in counter-current contact with a reflux liquid withdrawn from the ethylene-ethane splitter, designated by the numeral 74.

The second stage hydrogenation facility contains a cobalt molybdate catalyst and under conditions known in the art converts acetylene remaining in the gaseous stream to ethylene, reducing the acetylene content to less than 5 p.p.m. However, as indicated above, in conventional systems where the demethanizer bottoms are passed directly to the second stage hydrogenation facility, the methanol in the gas stream, although intermittently injected, is sufficient to cause poisoning of the cobalt-molybdate catalyst.

Following the second stage hydrogenation, the gaseous stream is passed by a line 76 to the ethylene-ethane splitter or fractionation tower 74 wherein it is subjected to fractionation under sufficient pressure to separate the ethylene from the ethane and other heavier components. In this instance, the splitter is a multiple tray column operated at a superatmospheric pressure which is sufficiently less than the pressure in the demethanizer to overcome the pressure drop through the scrubber tower and hydrogenation facilities.

In the splitter column 74, an ethylene fraction is discharged from the top of the column through a line 78 to a condenser 80 where the fraction is partially condensed and passed to a separator 82. The gaseous fraction being substantially pure ethylene is withdrawn from the separator in line 84 and the reflux liquid fraction is returned to the tower by reflux pumps 86. The tower is provided with a reboiler 88 in which a heating medium partially vaporizes the liquid bottoms portion in the bottom of the tower, the residual fraction remaining after reboiling, principally ethane, being removed from the bottom of the tower in line 90.

In accordance with the invention, part of the ethylene-ethane, liquid, reflux mixture being returned to the tower by pump 86 is withdrawn through line 92 and returned as liquid reflux to the vaporizer and scrubber column. It is introduced into the scrubber column above the first tray, or above the packing, and passes in counter-current contact with the vapor stream serving to condense substantially all of the methanol and hydrocarbons heavier than ethane from the stream while allowing substantially all of the ethylene-ethane mixture to flow as vapor to the acetylene hydrogenator. The height of the contact area in the scrubber column and the flow rate of the $C_2$-rich liquid stream are the principal factors adjusted to achieve a heat transfer whereby the above occurs. Preferably, the height of the contact area is held to a minimum. In this instance, the column contains five trays.

In an example in accordance with the invention, the product stream from the bottom of the demethanizer, at a flow rate of about 19,600 lbs. per hr., will contain about a 4.8 mol percent of methanol and heavier hydrocarbons. In the vaporizer and scrubber, wherein the product stream is contacted with an ethylene lean reflux liquid fed from the splitter at a rate of about 409 lbs. per hr., substantially all of the methanol and hydrocarbons heavier than ethane will be withdrawn as a bottoms mixture containing only a small part of the ethylene and ethane. The feed to the hydrogenator on the other hand will be substantially free of methanol, and will contain less than a 2.5 mol percent of hydrocarbons heavier than ethane, with a substantially complete elimination of $C_5$ and $C_6$ hydrocarbons. Following hydrogenation, trace amounts of acetylene will be substantially removed, and after a long period of running, practically no acetylene leakage will occur, indicating improved catalyst life.

In the ethylene-ethane splitter, the bottoms mixture will be maintained at the temperature desired for optimum heat recovery To avoid the use of a heat exchanger or vaporizer for the scrubber column separate from the reboiler in the demethanizer tower, the reboiler for the demethanizer tower may also be used as a vaporizer for the scrubber column. Referring to FIG. 2, the bulk of the demethanizer bottoms material is fed by a line 94 into a reboiler 96 heated by a coil 98. While a major portion of the vaporized stream is returned to the demethanizer tower in line 100, a small portion of the stream is passed in line 101 to the scrubber column 102 where it is subjected to counter-current contact with reflux withdrawn from the ethylene-ethane splitter in the manner described with reference to FIG. 1. Preferably, the scrubber column in this example is operated at a pressure equal to the bottom pressure in the demethanizer tower.

In this embodiment, as illustrated in FIG. 3, as an alternative, it may be found more convenient to physically associate the heating coil and reboiler with the scrubber column (103), and to withdraw a major portion of the vapor from the top of the reboiler in line 104 and return it to the demethanizer. With this arrangement, the structure of the scrubber column and vaporizing unit would resemble that illustrated in FIG. 1, except that the vaporizing unit would be a larger duty unit to serve both as a reboiler and a vaporizer for the scrubber.

In a third embodiment, FIG. 4, a main portion of the demethanizer bottoms material is withdrawn from a lower part of the demethanizer tower in line 108 as a side stream vapor and introduced into the bottom of the scrubber column 110. The vapor side stream contains substantially all of the ethylene and ethane present in the demethanizer, and a small bottoms liquid stream is withdrawn from the tower in line 112 containing the bulk of the methanol and heavier hydrocarbons. The remaining portion of methanol and heavier hydrocarbons is substantially removed from the vapor side stream in the manner described with reference to FIG. 1.

Since the material in the bottom of the demethanizer tower is largely heavier hydrocarbons, the bottoms temperature may be somewhat higher. Accordingly, the demethanizer would be operated at a lower pressure and lower refrigeration temperature, but only a single heat exchange unit, reboiler 114, would be required.

Many modifications will be apparent to those skilled in the art. For instance, the flow sheet arrangement was provided only by way of example to establish the relationship of the vaporizing and scrubbing steps to the remainder of the recovery systems. The invention readily may be used in other recovery systems. Also, as indicated, the reflux for the scrubbing column may be withdrawn from any point on the ethylene-ethane splitter. Although the invention has been described with respect to the use of methanol to prevent freezing, it may also be applicable with the use of other anti-icing agents, for instance ethanol. Other arrangements are within the spirit and scope of the invention.

Accordingly, the invention is to be limited in scope only as defined in the following claims.

What is claimed is:

1. A process for the recovery of ethylene from a mixture of light gases including methane, hydrogen and acetylene, comprising the steps of compressing and cooling the mixture and subjecting it to demethanization to separate the hydrogen and methane as a gaseous fraction, this step including adding an anti-icing agent to the gas feed to prevent freezing; vaporizing the demethanizer liquid bottoms material; hydrogenating the vaporized bottoms in a hydrogenation facility to convert traces of the acetylene to ethylene; and fractionating the hydrogenated stream in an ethylene-ethane splitter to obtain substantially pure ethylene; the improvement comprising subjecting the vaporized, demethanizer bottoms stream prior to hydrogenation to scrubbing in counter-current contact with a $C_2$-rich liquid withdrawn from the ethylene-ethane splitter to condense the anti-icing agent and hydrocarbons heavier than ethane from the stream.

2. A process according to claim 1 wherein the $C_2$-rich liquid is a portion of the condensed reflux from the ethylene-ethane splitter.

3. A process according to claim 1 wherein the demethanizer bottoms stream prior to hydrogenation is fed into a vaporizer scrubber column having a contact area, the $C_2$-rich liquid stream being introduced above the contact area, the demethanizer bottoms stream being introduced below the contact area but above the vaporizer.

4. A process according to claim 3 wherein the height of the contact area in the scrubber column and flow rate of the $C_2$-rich liquid stream are sufficient to effect a heat transfer from the vaporized anti-icing agent and heavier than ethane hydrocarbons in the demethanizer bottoms to the liquid stream whereby the former are condensed, the area of contact being the minimum required.

5. A process according to claim 1 including an absorption zone prior to demethanization for obtaining an ethane and lighter fraction wherein the demethanizer feed mixture includes amounts of absorber oil used in the absorption zone, substantially complete elimination of the oil from the ethylene-ethane mixture by the scrubbing liquid being effected.

6. A process for the recovery of ethylene from a mixture of light gases including methane, hydrogen and acetylene, comprising the steps of compressing and cooling the mixture, and introducing methanol into the feed stream to prevent freezing; feeding the mixture into a demethanizer tower having a reboiler and subjecting it to demethanization under reflux conditions, this step including adding methanol to the demethanizer tower to prevent freezing; vaporizing the demethanizer bottoms material; hydrogenating the vaporized bottoms material in a hydrogenation facility to convert traces of the acetylene to ethylene; and fractionating the hydrogenated stream in an ethylene-ethane splitter to obtain substantially pure ethylene; the improvement comprising subjecting the vaporized bottoms material prior to hydrogenation to scrubbing in counter-current contact with a $C_2$-rich liquid withdrawn from the ethylene-ethane splitter to condense the methanol and heavier hydrocarbons from the stream.

7. A process according to claim 6 wherein a single vaporizer unit serves as the demethanizer reboiler and as means to vaporize the ethylene-ethane mixture prior to hydrogenation.

8. A process for the recovery of ethylene from a mixture of light gases including methane, hydrogen and acetylene, comprising the steps of compressing and cooling the mixture and subjecting it to demethanization to separate the hydrogen and methane as a gaseous fraction, this step including adding methanol to the gas feed to prevent freezing; vaporizing the demethanizer bottoms material; returning a portion of the vaporized bottoms to the demethanizer tower and hydrogenating the remaining portion in a hydrogenation facility to convert traces of acetylene to ethylene; and fractionating the hydrogenated stream in an ethylene-ethane splitter to obtain substantially pure ethylene; the improvement comprising subjecting the portion of the demethanizer bottoms material to be hydrogenated prior to hydrogenation to scrubbing by counter-current contact with $C_2$-rich liquid withdrawn from the ethylene-ethane splitter to condense the methanol and hydrocarbons heavier than ethane from the stream.

9. A process for the recovery of ethylene from a mixture of light gases including methane, hydrogen and acetylene and requiring the removal of all but about 5 p.p.m. of the acetylene, which includes the steps of deethanizing the mixture in an absorber-deethanizer containing an absorber oil; passing the hydrogen, ethane and lighter hydrocarbon mixture containing a small quantity of $C_3$ hydrocarbons and absorber oil to first stage hydrogenation and caustic treating facilities to remove sulphur compounds and a major portion of the acetylene; compressing, refrigerating and drying the gaseous stream, and adding methanol to the feed stream to prevent freezing; demethanizing the mixture under reflux conditions to remove methane and hydrogen; vaporizing the demethanizer bottoms material and hydrogenating a portion of the same in a second stage hydrogenation facility to remove the last traces of acetylene; and processing the hydrogenated material in an ethylene-ethane splitter to recover substantially pure ethylene as an overhead product from the splitter; the improvement comprising subjecting the portion of the vaporized demethanizer bottoms to be hydrogenated prior to hydrogenation to a scrubbing step with a reflux $C_2$-rich liquid stream withdrawn from any tray of the ethylene-ethane splitter, the scrubbing step serving to condense substantially all of the methanol and hydrocarbons heavier than ethane from the gas stream.

10. A process for the recovery of ethylene from a mixture of light gases including methane, hydrogen and acetylene comprising the steps of compressing and cooling the mixture, and introducing methanol into the feed stream to prevent freezing; feeding the mixture into a demethanizer tower having a reboiler and subjecting it to demethanization under reflux conditions; withdrawing a vapor side stream mixture from a lower part of the demethanizer containing substantially all of the ethylene and ethane in the tower and passing it to a scrubber column; withdrawing the scrubber column overhead and subjecting it to hydrogenation with a suitable catalyst to convert trace amounts of acetylene to ethylene; and fractionating the hydrogenated stream in an ethylene-ethane splitter to obtain substantially pure ethylene; the scrubbing liquid for the scrubber column being a $C_2$-rich liquid withdrawn from the ethylene-ethane splitter.

References Cited by the Examiner

UNITED STATES PATENTS

| 2,804,488 | 8/57 | Cobb | 260—677 |
| 2,938,934 | 5/60 | Williams | 260—677 |
| 3,003,008 | 10/61 | Fleming et al. | 260—677 |

ALPHONSO D. SULLIVAN, Primary Examiner.

JAMES S. BAILEY, Examiner.